(12) United States Patent
Zhao et al.

(10) Patent No.: US 10,003,633 B2
(45) Date of Patent: Jun. 19, 2018

(54) METHOD AND DEVICE FOR RESUMING FILE DOWNLOAD

(75) Inventors: Chenxi Zhao, Beijing (CN); Jinwei Li, Beijing (CN); Zhenyu Xie, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 615 days.

(21) Appl. No.: 14/004,451

(22) PCT Filed: Mar. 5, 2012

(86) PCT No.: PCT/CN2012/071931
§ 371 (c)(1),
(2), (4) Date: Sep. 11, 2013

(87) PCT Pub. No.: WO2012/122907
PCT Pub. Date: Sep. 20, 2012

(65) Prior Publication Data
US 2014/0006558 A1    Jan. 2, 2014

(30) Foreign Application Priority Data

Mar. 11, 2011   (CN) .......................... 2011 1 0059871

(51) Int. Cl.
*H04L 29/08*   (2006.01)
(52) U.S. Cl.
CPC .......... *H04L 67/06* (2013.01); *H04L 67/2823* (2013.01)
(58) Field of Classification Search
CPC ........................... H04L 67/06; H04L 67/2823
USPC ...................................................... 709/217
See application file for complete search history.

(56) References Cited

U.S. PATENT DOCUMENTS

| 6,377,974 | B1* | 4/2002 | Feigenbaum | H04L 29/06 709/203 |
| 6,938,083 | B1* | 8/2005 | Teague | G06F 17/30864 707/999.101 |
| 8,725,565 | B1* | 5/2014 | Ryan | G06Q 30/0269 705/14.4 |
| 2003/0137691 | A1* | 7/2003 | Tanaka | G06F 3/1204 358/1.15 |

(Continued)

FOREIGN PATENT DOCUMENTS

| CN | 1909521 A | 2/2007 |
| CN | 101064910 A | 10/2007 |
| CN | 101741808 A | 6/2010 |

OTHER PUBLICATIONS

International Search Report for PCT/CN2012/071931.
Written Opinion of the International Searching Authority dated Jun. 7, 2012 in connection with PCT/CN2012/071931.

*Primary Examiner* — Aaron Strange
(74) *Attorney, Agent, or Firm* — Troutman Sanders LLP (57) ABSTRACT

The present invention relates to a method and a device for resuming download. The method for resuming download comprises: converting a file incompletely downloaded by a first download tool to a file identifiable to a second download tool, so that the second download tool resumes downloading the incompletely-downloaded file, wherein the first download tool and the second download tool are different download tools. The present invention implements relay download of different download tools, and can be applied to file download, so as to avoid wasting network resources and time of users.

13 Claims, 5 Drawing Sheets

(56) References Cited

U.S. PATENT DOCUMENTS

| | | | |
|---|---|---|---|
| 2004/0243787 A1* | 12/2004 | Hirose | G06F 9/4843 712/1 |
| 2008/0162666 A1* | 7/2008 | Ebihara | H04L 67/06 709/217 |
| 2009/0003592 A1* | 1/2009 | Hanai | H04N 7/1675 380/29 |
| 2009/0328124 A1* | 12/2009 | Khouzam | H04N 21/234354 725/116 |
| 2010/0144330 A1* | 6/2010 | Ahlin | G06F 17/30899 455/418 |
| 2011/0107192 A1* | 5/2011 | Ge | A61K 31/12 715/202 |
| 2011/0283229 A1* | 11/2011 | Petrovicky | G06F 17/30067 715/809 |
| 2012/0079606 A1* | 3/2012 | Evans | G06F 21/10 726/28 |
| 2012/0122438 A1* | 5/2012 | Renou | H04L 65/80 455/414.4 |

* cited by examiner

New file.rar.se!
SE! file
320 KB

Fig. 3

New file.zip.td
Thunder temporary data file
34,748 KB

Fig. 4

New file.zip.td.cfg
CFG file
10KB

METHOD AND DEVICE FOR RESUMING FILE DOWNLOAD

This application claims priority to PCT/CN2012/071931 filed Mar. 5, 2012 and to Chinese Appl. No. 201110059871.7 filed Mar. 11, 2011.

FIELD OF THE INVENTION

The present invention relates to the field of Internet technologies, and particularly to a method and device for resuming file download.

BACKGROUND OF THE INVENTION

Along with rapid development of Internet technologies, more and more people start using the Internet, and they get information and download files such as documents, films or games via networks.

Currently, people may download data by using a variety of download tools, such as Thunder Download, FlashGet Download, BT Download, eMule Download, IE Download, or Browser Download. Among the many download tools, the Browser Download does not require installation of any download tool software, and can be automatically upgraded along with the browser, operations of which are simple and convenient.

However, with using a browser to download data, once an exception (e.g., automatic close) occurs in the browser and files being downloaded are not downloaded completely, data already downloaded have to be abandoned, and then the user has to turn to other download tools to re-download, thereby causing inconvenience to the user.

In addition, when the user employs a download tool to download a file, if he finds the download speed of the download software is too slow after part of data are already downloaded, he has to continue the download because if he turns to other download tools, the already downloaded part of data will get abandoned, which seriously affect the efficiency.

Therefore, the current mode of directly abandoning the incompletely-downloaded data and then choosing other download tools to re-download data causes waste of resources and seriously consumes the user's time.

SUMMARY OF THE INVENTION

The present invention provides a method and device which can use different download tools to resume file download.

According to a first aspect, the present invention provides a method of resuming file download, comprising: converting a file incompletely downloaded by a first download tool to a file identifiable by a second download tool, so that the second download tool resumes downloading the incompletely-downloaded file, wherein the first download tool and the second download tool are different download tools.

Preferably, the step of converting the file incompletely downloaded by the first download tool to the file identifiable by the second download tool is executed by the first download tool or the second download tool.

Preferably, converting the file incompletely downloaded by the first download tool to the file identifiable by the second download tool comprises the step of, upon executing the incompletely-downloaded file, triggering converting the file incompletely downloaded by the first download tool to the file identifiable by the second download tool.

Preferably, the second download tool and the first download tool use a downloading mode of the same network transmission protocol for file download, and use different file formats to store the incompletely-downloaded file.

Preferably, the second download tool and the first download tool use downloading modes of different network transmission protocols for file download, and use different file formats corresponding to the downloading modes of the different network transmission protocols to store the incompletely-downloaded file.

Preferably, a format conversion comparison table is stored in a system where the first download tool and the second download tool lie and used to achieve conversion between file formats of incompletely-downloaded files stored by different download tools; converting the file incompletely-downloaded by the first download tool to the file identifiable by the second download tool comprises: converting a file format of the file incompletely downloaded by the first download tool to a file format of the file identifiable by the second download tool according to the format conversion comparison table.

Preferably, prior to converting the file incompletely downloaded by the first download tool to the file identifiable by the second download tool, the method further comprises: correspondingly generating a mapping table for completely-downloaded and/or incompletely-downloaded files and their storage addresses, using the mapping table to look up whether the file exists upon executing redownloading or resumed downloading of the file, and prompting the user if the file already exists.

Preferably, the mapping table further comprises unique identifiers and local storage addresses of the completely-downloaded and/or incompletely-downloaded files.

Preferably, the unique identifier comprises at least one of file feature, file copyright information, resource name and resource download address.

Preferably, the step of prompting the user comprises: checking whether the file has already been download completely, and promoting the user that the file has already existed if the download is completed; or if the download is not completed, performing a check operation and prompting the user whether to need to perform file format conversion of the file.

Preferably, after converting the file incompletely downloaded by the first download tool to the file identifiable by the second download tool so that the second download tool resumes downloading the incompletely-downloaded file, the method further comprises: obtaining a preset resource list which comprises a resource identifier and a resource obtaining address of the same resource in the download tools performing file download by using different network transmission protocols; obtaining the resource obtaining address of the incompletely-downloaded file in the second download tool according to the resource list, and obtaining data of the incompletely-downloaded file from the resource obtaining address to complete download of the incompletely-downloaded file.

Preferably, the resource identifier is a resource code; the resource obtaining address of the same resource in the download tools performing file download by using different network transmission protocols is a download address of the same resource in the different network transmission protocols.

Preferably, content data and download state of the incompletely-downloaded file are stored in a system where the first download tool and the second download tool lie; the first download tool and the second download tool are only capable of identifying the incompletely-downloaded files stored respectively by themselves.

Preferably, the download state comprises a downloaded percentage of the incompletely-downloaded file, and/or a storage address of the incompletely-downloaded file.

According to a second aspect, the present invention provides a device of resuming file download, comprising: an analyzing module configured to convert the file incompletely downloaded by the first download tool to a file identifiable by the second download tool, so that the second download tool resumes downloading the incompletely-downloaded file, wherein the first download tool and the second download tool are different download tools.

Preferably, the first download tool or the second download tool triggers the analyzing module so that the analyzing module converts the file incompletely downloaded by the first download tool to the file identifiable by the second download tool.

Preferably, when the incompletely-downloaded file is executed, the analyzing module is triggered to convert the incompletely-downloaded file to the file identifiable by the second download tool.

Preferably, a format conversion comparison table is stored in the analyzing module and used to achieve conversion between file formats of the incompletely-downloaded files stored by different download tools; and the analyzing module is configured to, according to the format conversion comparison table, convert the file format of the file incompletely downloaded by the first download tool to the file format of the file identifiable by the second download tool.

Preferably, the second download tool and the first download tool use downloading modes of different network transmission protocols for file download, and use different file formats corresponding to the downloading mode of the different network transmission protocols to store the incompletely-downloaded file; and the device for resuming file download further comprises: a resource address obtaining module configured in a way that after the analyzing module converts the file incompletely downloaded by the first download tool to the file identifiable by the second download tool so that the second download tool resumes downloading the incompletely-downloaded file, the second download tool or the analyzing module obtains a preset resource list which comprises a resource identifier and a resource obtaining address of the same resource in the download tools performing file download by using different network transmission protocols; and the resource obtaining address of the incompletely-downloaded file in the second download tool is obtained according to the resource list, and data of the incompletely-downloaded file is obtained from the resource obtaining address to complete download of the incompletely-downloaded file.

The present invention can make the file incompletely downloaded by a download tool to be continued to be downloaded completely by another download tool, thereby achieving relay download of a plurality of download tools. The present invention brings convenience to the user, avoids wasting network resources and time of the user, and enables the user to freely choosing a download tool with an optimal download speed, and meanwhile, the user need not remember what download tools were used to download various incompletely-downloaded data, so the present invention may also assist the user in managing the downloaded data in a unified way and let the user have a better experience.

BRIEF DESCRIPTION OF THE DRAWINGS

Specific embodiments according to the present invention will be described in more detail with reference to the drawings, in which.

DETAILED DESCRIPTION OF THE INVENTION

Figure 1:
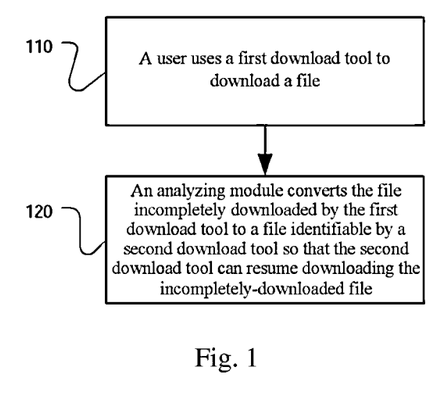
FIG. 1 is a flow chart of a method of resuming file download according to an embodiment of the present invention.

FIG. 1 is a flow chart of a method of resuming file download according to an embodiment of the present invention.

Resumed download is also called breakpoint resumed download and means that during download, a download task (a file or a compression package) is divided into several portions as desired by the user, each portion is downloaded by a thread, and if a network fault occurs, subsequent undownloaded portions can be continued to download from the already downloaded portion, and it is unnecessary to download from the very beginning. In the method of resuming file download of the present embodiment, a user uses a first download tool to download a file in step 110.

In step 120, an analyzing module converts the file incompletely downloaded by the first download tool to a file identifiable by a second download tool, so that the second download tool can resume downloading the incompletely-downloaded file.

The method of resuming file download according to the present invention is described in detail by way of taking the download module of the browser as the first download tool.

Figure 2:
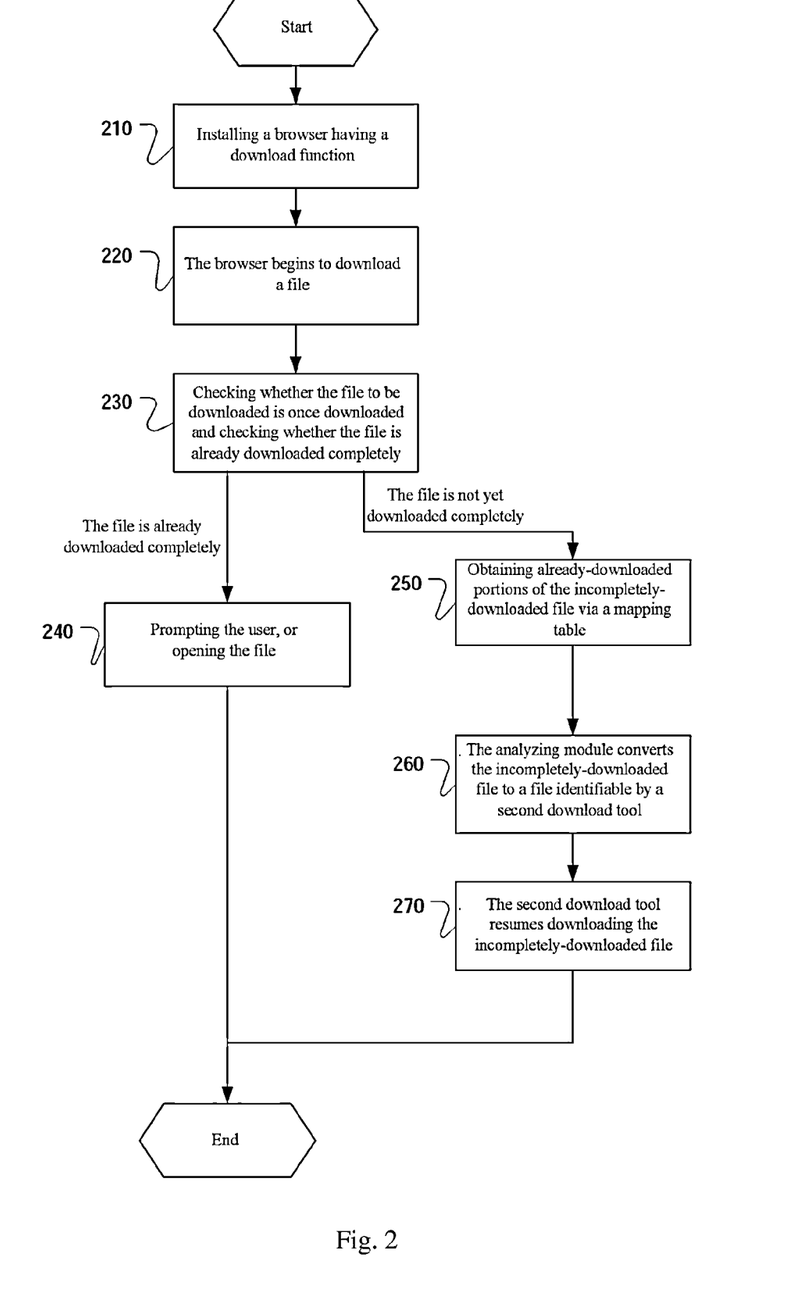
FIG. 2 is a flow chart of a method of resuming file download according to a preferred embodiment of the present invention.

Referring to FIG. 2, FIG. 2 is a flow chart of a method of resuming file download according to a preferred embodiment of the present invention.

In step 210, the user installs the browser having a download function.

In step 220, based on the user's operation, the browser begins to download the file and saves it to local.

Content data and download state of the downloaded file may be saved in the form of a file, or in the form of a plurality of separate files.

The above content data refer to target file data to be obtained by the user by download. The download state refers to data recording a download state during download, for example, state information such as a downloaded percentage and storage address. Since the downloading tools may employ different storage forms after completion of download of the file and the format of the download state may be different, the analyzing module of the present invention needs to be utilized to convert the file incompletely downloaded by the first download tool to the file identifiable by the second download tool so that the second download tool can resume downloading the incompletely-downloaded file.

In step 230, to re-download or resume downloading the above download file, the second download tool (i.e., another download tool different from the download tool used in the above steps 210, 220, such as Thunder download tool) checks whether the file to be downloaded has already existed, namely, checks whether the filed has been already downloaded, and check whether the file has been completely downloaded if the file has already been downloaded.

In an example, a mapping table for storage of the downloaded files is preset in local, which mapping table is used to indicate the downloaded files and their corresponding storage addresses, and the mapping table not only maps the incompletely-downloaded files but also includes completely-downloaded files. Further, the mapping table further comprises a unique identifier of the downloaded file and a local storage address of the downloaded file. The unique identifier comprises file feature, file copyright information, resource name and resource download address. Preferably, the file feature of the downloaded file is extracted by md5 algorithm. After the browser completes download of the file, the already downloaded file is recorded in the mapping table to avoid repeated download, thereby knowing whether the file is already downloaded by looking up the mapping manner upon executing re-download or resumed download of the file. Since the mapping table comprises completely-downloaded files as well as incompletely-downloaded files, it may be known from the mapping table whether once-downloaded files are downloaded completely.

In another example, the second download tool or analyzing module looks up resources at local, thereby determining whether there are the same resources already downloaded and thereby determining whether the file is once downloaded.

In step 240, if the file to be downloaded is a completely-downloaded file, namely, a complete file, the user is prompted that the file is already downloaded or the file is directly opened, namely, execute the file. If the file to be downloaded is not found from the mapping table, this indicates that the file does not exist in local, whereupon the second download tool activates download of the file to be downloaded and correspondingly saves the storage address and the downloaded file in the mapping table.

In step 250, if the file is an incompletely-downloaded file, namely, an incomplete file, already downloaded portions of the incompletely-downloaded file are obtained by looking up the mapping table, and then the file is found at the original storage address.

Figure 3:
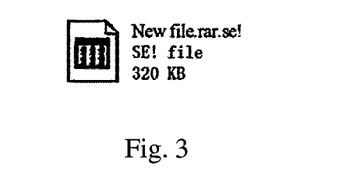
FIG. 3 is a schematic view of a file incompletely downloaded with an extention SE!

In an example, the incompletely-downloaded file is a file with an extention SE!, as shown in FIG. 3. FIG. 3 is a schematic view of the incompletely-downloaded file with the extention SE!.

At step 260, if the incompletely-downloaded file needs to be converted to the file identifiable by the second download tool, the analyzing module converts the file incompletely-downloaded to the file identifiable by the second download tool.

In an embodiment of the present invention, the analyzing module is disposed in the browser having the download function, i.e., the analyzing module is disposed in the first download tool and triggered by the first download tool, and thereby is utilized to convert the incompletely-downloaded file to the file identifiable by the second download tool. For example, the user utilizes the first download tool to download a video file, but downloads it incompletely, and then the first download tool triggers the analyzing module and converts the incompletely-downloaded video file to the file identifiable by the second download tool. If the second download tool is a media player having a download function, the second download tool can identify and continue to download the video file. Furthermore, if the first download tool downloads the file data in the order of a time axis of the video file, the media player having the download function may continue to download and play the video file in the form of a media stream.

In another embodiment of the present invention, the incompletely-downloaded file is associated with the analyzing module, i.e., once the incompletely-downloaded file is triggered and executed, the analyzing module will be activated, for example, the user double-clicks or right-key opens the incompletely-downloaded file, then the analyzing module converts the incompletely-downloaded file to the user-designated file identifiable by the second download tool; wherein the above file association refers to a dependency relation established between a type of file and a program (or tool) which can execute it.

In a yet another embodiment of the present invention, the analyzing module is provided in the second download tool, i.e., the second download tool may use the analyzing module to convert the incompletely filed file to the file identifiable by the second download tool. For example, the user utilizes the first download tool to download a video file, but downloads it incompletely, and then the second download tool triggers the analyzing module and converts the incompletely-downloaded video file to the file identifiable to the second download tool. If the second download tool is a media player having a download function, the second download tool can identify and continue to download the video file. Furthermore, if the first download tool downloads the file data in the order of a time axis of the video file, the media player having the download function may continue to download and play the video file in the form of a media stream.

In a further yet another embodiment of the present invention, the analyzing module is invoked by the first download tool or second download tool via API, and executes a file conversion task designated by the user, wherein the API (Application Programming Interface) is some pre-defined functions.

Specifically, the method of the analyzing module converting the incompletely-downloaded file to the file identifiable to the second download tool comprises: storing a format conversion comparison table in the analyzing module, and storing the format and/or format conversion method of incompletely-downloaded files of at least two download tools in the comparison table, wherein the comparison table may achieve format conversion of incompletely-downloaded files stored by different download tools.

Specifically, further illustration will be presented by way of an example that after 360 SE browser is used to download part of the file, the Thunder download tool performs resumed download.

Figure 4:
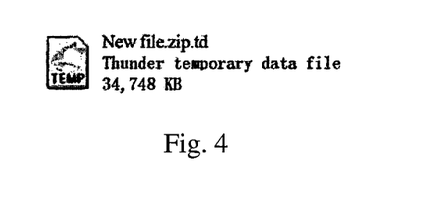
FIG. 4 is a schematic view of a td file generated from the SE! file of FIG. 3.
Figure 5:
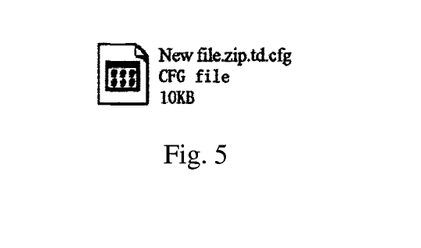
FIG. 5 is a schematic view of a td.cfg file generated from the SE! file of FIG. 3.
Figure 6:
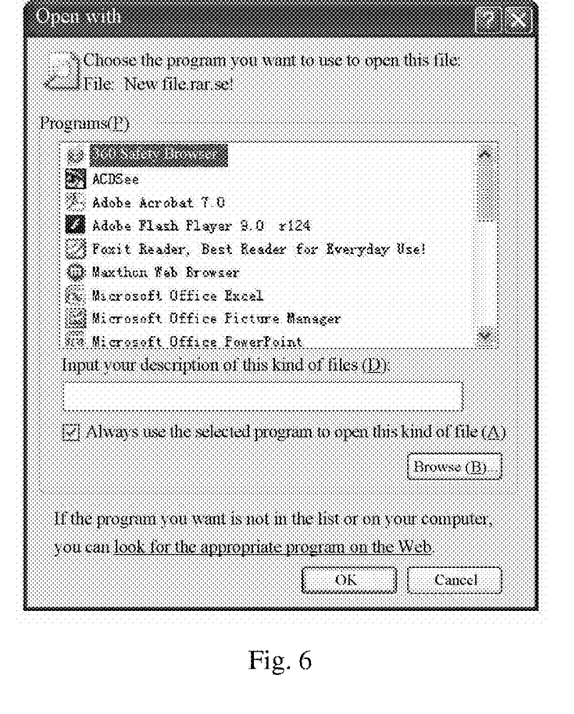
FIG. 6 is a schematic view of an open-with dialog box.

For the 360 SE browser, its incompletely-downloaded file is a file with the extention SE!, as shown in FIG. 3. For Thunder, the incompletely-downloaded file identifiable by it is a temporary data file with an extention td and a CFG file with an extention td.cfg, as shown in FIG. 4 and FIG. 5. FIG. 4 illustrates the td file generated from the SE! file of FIG. 3. FIG. 5 illustrates td.cfg file generated from the SE! file in FIG. 3.

The method of converting the SE! file of FIG. 3 to the td file of FIG. 4 and td.cfg file of FIG. 5 is: the analyzing module extracts content data of the SE! file according to the comparison table and coverts the content data to the file with the extention td, and the file with the extention td is content data that can be identified by the Thunder download tool, and meanwhile, the analyzing module extracts a download state in the above incompletely-downloaded file according to the comparison table and generates the file with the extention td.cfg. The file with the extention td.cfg is a download state which can be identified by the Thunder download tool and used to describe state information such as a downloaded percentage and storage addresses of the SE! file.

In step 270, the above second download tool performs resumed download for the incompletely-downloaded file.

It would be noted that, the first download tool and the second download tool may be different types of download tools. Said different types refer to download modes of different network transmission protocols, including P2P download mode, http download mode, ftp download mode and the like. For example, one download tool is P2P download and the other download tool is HTTP download or FTP download.

Where the first download tool and the second download tool are in different types, the second download tool or analyzing module obtains a resource list from a server or local according to a request of the second download tool, which resource list comprises a resource obtaining address of the same resource in different types of download tools so that the second download tool can still obtain the corresponding resource after the download tool type is changed.

Specifically, in the above resource list is stored a resource code for uniquely identifying the resource, and a download address of the resource in different network transmission protocols. After the user shifts to a different download tool to resume download, the second download tool or analyzing module for resuming the download obtains a resource code of the incompletely-downloaded file, and looks for, in a server or a resource list preset in local, a download address corresponding to the resource code, so as to ensure resumed download after the analyzing module converts the incompletely-downloaded file.

In addition, the first download tool and the second download tool may be the same type of download tools which store the incompletely-downloaded file in different formats.

The aspects of the present invention are not limited to the above description, and the above steps are only examples for illustration purpose. A main purpose of the present invention is to provide convenience for different download tools to resume download. All solutions of using the analyzing module to convert the incompletely-downloaded file to the file identifiable by other download tools to achieve resumed download shall all fall into the scope of the present invention. It may be appreciated that the above first download tool and the second download tool may also be different download modules in the same software, and the analyzing module may be used to achieve shifted download through different download tools.

In an example of the present invention, the first download tool and the second download tool can only identify incompletely-downloaded files stored respectively by themselves respectively, but are not limited to this. The second download tool achieving the resumed download might identify files stored in multiple forms. However, so long as it cannot identify the incompletely-downloaded files downloaded by the first download tool, the analyzing module is needed to execute file conversion so that the file is converted to the file identifiable by the second download tool.

Figure 7:
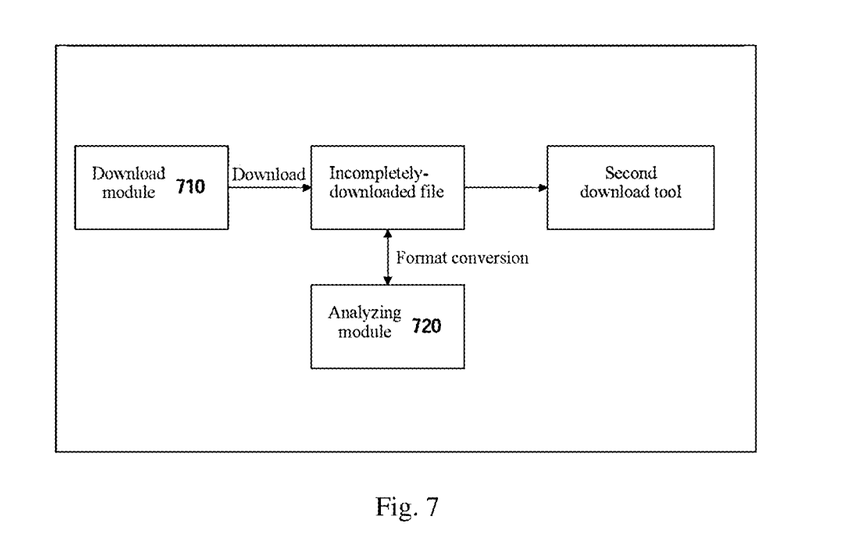
FIG. 7 is a schematic view of a download system according to an embodiment of the present invention.

FIG. 7 is a schematic view of a device of resuming file download according to an embodiment of the present invention.

The device comprises an analyzing module 720 configured to converts the file incompletely downloaded by the first download tool to a file identifiable by a second download tool, so that the second download tool can resume downloading the incompletely-downloaded file, wherein the first download tool and the second download tool are different download tools.

The device further comprises a download module 710 configured to use the first download tool to download the file. In an example, the download module 710 is a browser download tool.

Specifically, a format conversion comparison table is stored in the analyzing module 720 and used to achieve conversion between file formats of the incompletely-downloaded files stored by different download tools; the analyzing module 720 is configured to, according to the format conversion comparison table, convert the file format of the file incompletely downloaded by the first download tool to the file format of the file identifiable by the second download tool.

In an embodiment of the present invention, the first download tool or the second download tool triggers the analyzing module 720 so that the analyzing module 720 converts the file incompletely downloaded by the first download tool to the file identifiable by the second download tool.

In another embodiment of the present invention, the incompletely-downloaded file is associated with the analyzing module 720, and executing the incompletely-downloaded file requires to trigger the analyzing module 720, and the analyzing module 720 converts the incompletely-downloaded file to the file identifiable by the second download tool.

Figure 8:
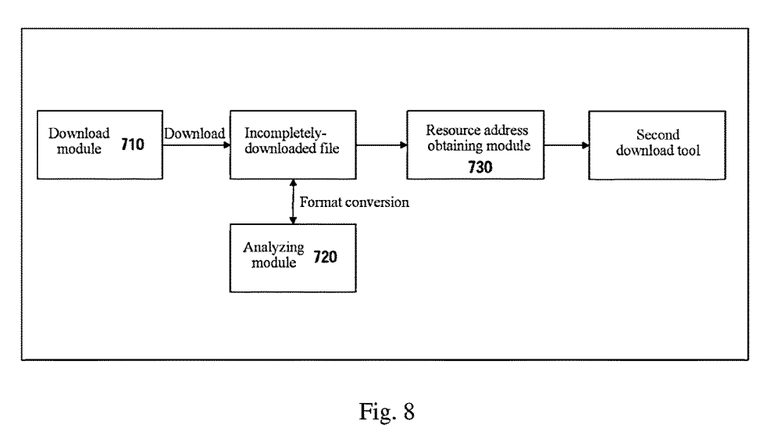
FIG. 8 is a schematic view of a download system according to a preferred embodiment of the present invention.

Preferably, the second download tool and the first download tool use downloading modes of different network transmission protocols for file download, and use different file formats corresponding to the downloading mode of the different network transmission protocols to store the incompletely-downloaded file. On the basis of the above device, the device for resuming file download preferably further comprises: a resource address obtaining module 730, as shown in FIG. 8. The resource address obtaining module 730 is configured in a way that after the analyzing module 720 converts the file incompletely downloaded by the first download tool to the file identifiable by the second download tool so that the second download tool resumes downloading the incompletely-downloaded file, the second download tool or the analyzing module 720 obtains a preset resource list which comprises a resource identifier and a resource obtaining address of the same resource in the download tools performing file download by using different network transmission protocols; the resource obtaining address of the incompletely-downloaded file in the second download tool is obtained according to the resource list, and data of the incompletely-downloaded file is obtained from the resource obtaining address to complete download of the incompletely-downloaded file.

It would be noted that the present invention is not limited to use in a PC (personal computer), and it may also be applied to various electronic devices such as a PDA (personal digital assistant) or a mobile phone. Moreover, information may be sent in a wired or wireless manner in the present invention.

The present invention may be implemented by being recorded in a computer-readable recording medium. The computer-readable recording medium includes any medium for storing or transmitting information in a computer-readable form, for example, read only memory (ROM), a random access memory (RAM), magnetic disk storage media, optical storage media, flash memory media, propagated signals in electrical, optical, acoustical or other forms (e.g., carrier waves, infrared signals, and digital signals).

The present invention may be used in many universal or dedicated computing system environments or configurations, for example: personal computers, server computers, hand-held devices or portable devices, flat panel devices, multiprocessor systems, microprocessor-based systems, set-top boxes, programmable consumer electronics, network PC, minicomputers, mainframe computers, a distributed computing environment including any of the above systems or devices.

Obviously, without departing from the true spirit and scope of the invention, the present invention described herein may have many variations. Therefore, all variations obvious for those skilled in the art shall be included in the scopes covered by the Claims. The scopes as claimed by the present invention are only defined by the appended Claims.

What is claimed is:

1. A method for resuming file download, comprising:
   generating a mapping table for completely-downloaded and/or incompletely-downloaded files and their storage addresses;
   using the mapping table to look up whether a file incompletely downloaded by a first download tool exists upon executing resumed downloading of the incompletely-downloaded file, and prompting the user whether to perform file format conversion upon determining the incompletely-downloaded file already exists;
   responsive to the user indicating to perform file format conversion, converting the incompletely-downloaded file to a file identifiable by a second download tool, so that the second download tool resumes downloading the incompletely-downloaded file, wherein the first download tool and the second download tool are different download tools and their respective identifiable files are different.

2. The method for resuming file download of claim 1, wherein
   converting the file incompletely downloaded by the first download tool to the file identifiable by the second download tool comprises the step of, upon executing the incompletely-downloaded file, triggering converting the file incompletely downloaded by the first download tool to the file identifiable by the second download tool.

3. The method for resuming file download of claim 1, wherein the second download tool and the first download tool use a downloading mode of the same network transmission protocol for file download, and use different file formats to store the incompletely-downloaded file.

4. The method for resuming file download of claim 1, wherein the second download tool and the first download tool use downloading modes of different network transmission protocols for file download, and use different file formats corresponding to the downloading modes of the different network transmission protocols to store the incompletely-downloaded file.

5. The method for resuming file download of claim 4, wherein after converting the file incompletely downloaded by the first download tool to the file identifiable by the second download tool so that the second download tool resumes downloading the incompletely-downloaded file, the method further comprises:

obtaining a preset resource list which comprises a resource identifier and a resource obtaining address of the same resource in the download tools performing file download by using different network transmission protocols; and
   obtaining the resource obtaining address of the incompletely-downloaded file in the second download tool according to the resource list, and obtaining data of the incompletely-downloaded file from the resource obtaining address to complete download of the incompletely-downloaded file.

6. The method for resuming file download of claim 5, wherein the resource identifier is a resource code, and the resource obtaining address of the same resource in the download tools performing file download by using different network transmission protocols is a download address of the same resource in the different network transmission protocols.

7. The method for resuming file download of claim 1, wherein a format conversion comparison table is stored in a system where the first download tool and the second download tool lie and used to achieve conversion between file formats of incompletely-downloaded files stored by different download tools; and
   converting the file incompletely downloaded by the first download tool to the file identifiable by the second download tool comprises: converting a file format of the file incompletely downloaded by the first download tool to a file format of the file identifiable by the second download tool according to the format conversion comparison table.

8. The method for resuming file download of claim 1, wherein the mapping table further comprises unique identifiers and local storage addresses of the completely-downloaded and/or incompletely-downloaded files.

9. The method for resuming file download of claim 8, wherein the unique identifier comprises at least one of file feature, file copyright information, resource name and resource download address.

10. The method for resuming file download of claim 1, wherein
    content data and download state of the incompletely-downloaded file are stored in a system where the first download tool and the second download tool lie; and
    the first download tool and the second download tool only identifies the incompletely-downloaded files stored by themselves.

11. The method for resuming file download of claim 10, wherein the download state comprises a downloaded percentage of the incompletely-downloaded file, and/or a storage address of the incompletely-downloaded file.

12. A device for resuming file download, comprising: a memory and processor configured to perform the method for resuming file download of claim 1.

13. A non-transitory computer-readable recording medium for recording thereon a program for executing the method for resuming file download of claim 1.

* * * * *